(12) United States Patent
Zhang et al.

(10) Patent No.: US 10,878,609 B2
(45) Date of Patent: Dec. 29, 2020

(54) EFFICIENT IMAGE SYNTHESIS

(71) Applicant: Advanced New Technologies Co., Ltd., George Town (KY)

(72) Inventors: Yu Zhang, Hangzhou (CN); Zhijun Du, Hangzhou (CN); Nan Wang, Hangzhou (CN); Wei Ding, Hangzhou (CN); Qiang He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/749,060

(22) Filed: Jan. 22, 2020

(65) Prior Publication Data

US 2020/0160577 A1 May 21, 2020

Related U.S. Application Data

(63) Continuation of application No. 15/716,332, filed on Sep. 26, 2017, now Pat. No. 10,692,261, which is a (Continued)

(30) Foreign Application Priority Data

Mar. 30, 2015 (CN) .......................... 2015 1 0144685

(51) Int. Cl.
*G06T 11/60* (2006.01)
*G06F 40/106* (2020.01)
(Continued)

(52) U.S. Cl.
CPC ............ *G06T 11/60* (2013.01); *G06F 40/106* (2020.01); *G06F 40/186* (2020.01); *G06T 3/40* (2013.01);
(Continued)

(58) Field of Classification Search
None
See application file for complete search history.

(56) References Cited

U.S. PATENT DOCUMENTS 6,404,936 B1 * 6/2002 Katayama ................ G06T 7/11
345/626
8,584,012 B1 * 11/2013 Orshanskiy ........... G06T 11/203
715/256
(Continued)

FOREIGN PATENT DOCUMENTS

CN 101093644 12/2007
CN 101174305 5/2008
(Continued)

OTHER PUBLICATIONS

Arora, Jagdish. "Digitisation: Methods, Tools and Technology." Developing Sustainable Digital Libraries: Socio-Technical Perspectives. IGI Global, 2010. 40-63. (Year: 2010).*

(Continued)

*Primary Examiner* — Sarah Le
(74) *Attorney, Agent, or Firm* — Fish & Richardson P.C.

(57) ABSTRACT

A method for synthesizing images includes selecting a background image from a plurality of source images and selecting one or more foreground elements from a plurality of source files. The foreground elements include at least one of a foreground image or a foreground text. The method further includes dividing at least a portion of the selected background image to one or more sub-regions for displaying the one or more selected foreground elements, each sub-region is used for displaying at least one foreground element. The method further includes determining a display format and a display location for each of the one or more foreground elements and synthesizing the one or more foreground elements to the corresponding one or more
(Continued)

sub-regions of the background image based on the display format and the display location.

17 Claims, 5 Drawing Sheets

Related U.S. Application Data continuation of application No. PCT/CN2016/076950, filed on Mar. 22, 2016.

(51) Int. Cl.
*G06F 40/186* (2020.01)
*G06T 3/40* (2006.01)
*G06T 5/20* (2006.01)
*G06T 11/00* (2006.01)

(52) U.S. Cl.
CPC .............. *G06T 5/20* (2013.01); *G06T 11/001* (2013.01); *G06T 2207/20221* (2013.01)

(56) References Cited

U.S. PATENT DOCUMENTS

| | | | | |
|---|---|---|---|---|
| 2002/0044686 | A1* | 4/2002 | Yamazaki | G06T 11/60 |
| | | | | 382/167 |
| 2003/0202212 | A1 | 10/2003 | Burgess et al. | |
| 2004/0080670 | A1 | 4/2004 | Cheatle | |
| 2004/0239643 | A1* | 12/2004 | Bangham | G06F 3/04847 |
| | | | | 345/173 |
| 2013/0016902 | A1 | 1/2013 | Suino | |
| 2013/0064465 | A1 | 3/2013 | Tin | |
| 2013/0235081 | A1* | 9/2013 | Ishibashi | G09G 5/377 |
| | | | | 345/638 |
| 2014/0132789 | A1 | 5/2014 | Koyama | |
| 2015/0067554 | A1* | 3/2015 | Lee | G06T 11/00 |
| | | | | 715/765 |
| 2015/0109323 | A1* | 4/2015 | Johnson | G06T 11/60 |
| | | | | 345/594 |
| 2015/0206310 | A1 | 7/2015 | Okada et al. | |
| 2018/0018800 | A1 | 1/2018 | Zhang et al. | |

FOREIGN PATENT DOCUMENTS

| | | |
|---|---|---|
| CN | 101442600 | 5/2009 |
| CN | 101853498 | 10/2010 |
| CN | 101998045 | 3/2011 |
| CN | 102158644 | 8/2011 |
| CN | 102262787 | 11/2011 |
| CN | 102938863 | 2/2013 |
| CN | 103491351 | 1/2014 |
| GB | 2378340 | 2/2003 |
| JP | H5066759 | 3/1993 |
| JP | H7273967 | 10/1995 |
| JP | H10187926 | 7/1998 |
| JP | 2001121775 | 5/2001 |
| JP | 2002077658 | 3/2002 |
| JP | 2003058878 | 2/2003 |
| JP | 2007129456 | 5/2007 |
| JP | 2014168221 | 9/2014 |
| WO | WO 2008133357 | 11/2008 |
| WO | WO 2010041034 | 4/2010 |

OTHER PUBLICATIONS

Crosby et al., "BlockChain Technology: Beyond Bitcoin," Sutardja Center for Entrepreneurship & Technology Technical Report, Oct. 16, 2015, 35 pages.
EP European Extended Search Report in European Application No. 16771291.8, dated Nov. 12, 2018, 8 pages.
Gosha [online], "5 Impressive Photohraphy Styles and How to Nail Them," Sep. 2014, [retrieved on Mar. 22, 2019], retrieved from: URL<https://www.sitepoint.com/5-photography-styles-web-design-nail/>, 28 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/076950, dated Oct. 3, 2017, 9 pages (with English Translation).
PCT International Search Report of the International Searching Authority issued in International Application No. PCT/CN2016/076950, dated Jun. 23, 2016, 9 pages.
PCT Written Opinion of the International Searching Authority in International Application No. PCT/CN2016/076950, dated Jun. 23, 2016, 7 pages (with English translation).
Valentine [online ], "The Hidden Power of Adjustment Layers in Adobe®Photoshop®," Peachpit, 2014, [retrieved on Mar. 22, 2019], retrieved from: URL <http://ptgmedia.pearsoncmg.com/images/9780321957719/samplepages/0321957717.pdf>, 67 pages.
Wang, "An Image Composition Method Based on Huge Amounts of Image Feature Representation," Dissertation, Dec. 13, 2015 (English Abstract only).

* cited by examiner

EFFICIENT IMAGE SYNTHESIS

This application is a continuation of U.S. patent application Ser. No. 15/716,332, filed on Sep. 26, 2017, which is a continuation of PCT Application No. PCT/CN2016/076950, filed on Mar. 22, 2016, which claims priority to Chinese Patent Application No. 201510144685.1, filed on Mar. 30, 2015, the entire contents of each are hereby incorporated by reference.

TECHNICAL FIELD

This disclosure relates to imaging processing, and more particularly to image synthesis.

BACKGROUND

Internet-based webpages and social media platforms often include many images. In some situations, a large number of images may need to be generated within a short period of time (for example, Internet-based promotional events or activities). Images may also need to be changed frequently, because using the same or similar images can cause user attention fatigue.

Images used by webpages or Internet applications are often generated by synthesizing one or more background images and one or more foreground elements. In some cases, a fixed template can be used to superimpose foreground elements on a fixed background image at fixed positions. When modification of an image is desired, a new template can be regenerated, or the background image, foreground elements, or their relative positions can be changed. These operations can consume a large amount of time and computing resources, especially with a large number of images to be synthesized.

SUMMARY

The present disclosure describes methods and systems, including computer-implemented methods, computer program products, and computer systems for efficient image synthesis.

In an implementation, a background image from a plurality of source images is selected. One or more foreground elements from a plurality of source files are selected, wherein the foreground elements include at least one of a foreground image or a foreground text. At least a portion of the selected background image is divided to one or more sub-regions for displaying the one or more selected foreground elements, wherein each sub-region is used for displaying at least one foreground element. A display format and a display location for each of the one or more foreground elements are determined, and the one or more foreground elements are synthesized to the corresponding one or more sub-regions of the background image based on the display format and the display location.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to generate a large number of synthesized images with different compositions within a short period of time, improve the efficiency of image synthesis, reduce the cost for image diversification. Because the synthesized images can have a variety of randomly generated or selected background images, foreground element layouts, shapes, and formats, they may also be more aesthetically pleasing to a user and more difficult to be detected by image detection technologies such as computer vision. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
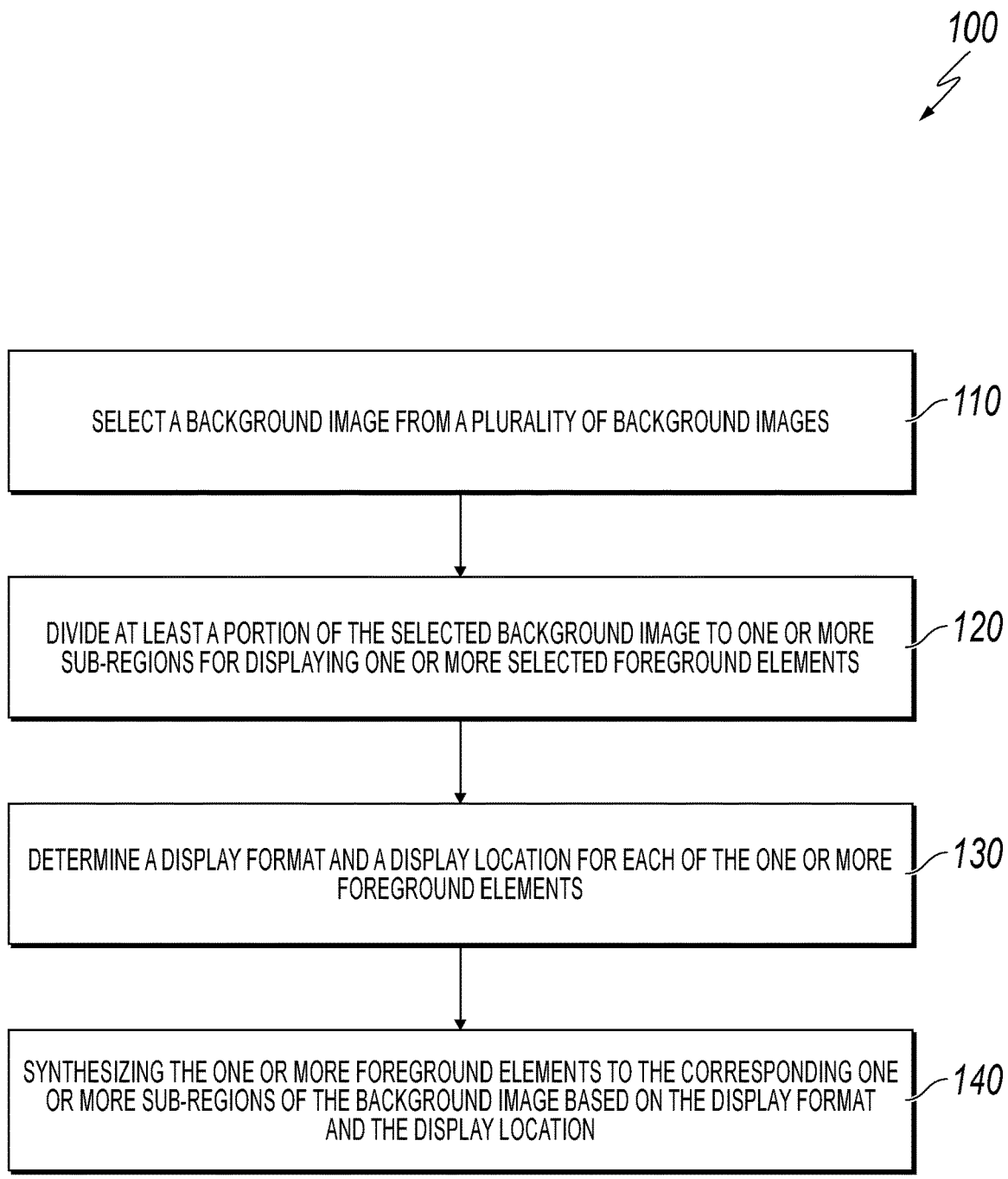
FIG. 1 is a flow chart illustrating an example process of generating a synthesized image, according to an implementation of the present disclosure.

The following detailed description describes efficient image synthesis, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Internet-based webpages and social media platforms often include many images. In some situations, a large number of images may need to be generated within a short period of time (for example, Internet-based promotional events or activities). Images also need to be changed frequently, because using the same or similar images can cause attention fatigue of the users.

Images used by webpages or Internet applications are often generated by synthesizing one or more background images and one or more foreground elements. In some cases, a fixed template can be used to superimpose foreground elements on a fixed background image at fixed positions. When modification of an image is desired, a new template can be regenerated, or the background image, foreground elements, or their relative positions can be changed. These operations can consume a large amount of time and computing resources, especially with a large number of images to be synthesized.

A synthesized image can be generated by using a background image, a foreground image, or a foreground text or a text line. The background image can be selected from source files stored on a server. In some implementations, the source files can include a plurality of background images, foreground images, and foreground text. An example of a foreground image can be a logo, which can be flexibly placed on different parts of, or at different locations on, the background image. The foreground text (for example, a line of text) can include one or more textual units. The textual units can be in a textual format that can be converted into images (for example, using a system font library or a graphics library), or can be images that correspond to particular text and are organized in a particular order.

When a Web or other server needs to generate a synthesized image (such as following receipt of a request from a client computing device or an image is scheduled to be changed), a background image can be randomly selected from the plurality of background images. In some implementations, the selected background image can be used as the background image for a synthesized image after Gaussian blurring processing with randomly selected parameters. Different parameters can allow the same background image to exhibit different features and to be perceived as a different background image, which can reduce commonality of images and maintain overall image aesthetics.

After determining the background image, a configuration algorithm can be used to calculate a layout of sub-regions on the background image. In some implementations, the algorithm can calculate a dynamic range for positioning the sub-regions with respect to the background image. The algorithm can perform the calculation based on, for example, a number of sub-regions, allowable sub-region size(s), and positional relationships included in a configuration file. The algorithm can also determine allowable locations of sub-region vertexes or borders, and size of each sub-region based on the calculated dynamic range and the configuration file. As such, the sub-regions for displaying the foreground image or foreground texts can be considered to be dynamically determined. The background image can determine the overall style of the synthesized image. The position and size of each sub-region can determine the layout of the synthesized image.

The foreground elements can include foreground images, foreground text, or a combination of both. In some implementations, a curve function can be selected from a plurality of available curve functions pre-stored in the server to display text. Example curve functions can include trigonometric functions or linear functions and can be pre-defined according to particular needs/customizations of the curve functions (for example, a software code description of the curve function). Prior to use in the described methodology, an appropriate curve function and associated parameters are chosen (for example, randomly or non-randomly) and generated for execution to create a desired curve. Parameter values for the selected curve function depend on the type of curve function selected. In some implementations, the parameter values can be pre- or randomly-determined within certain value ranges to generate a display curve. One or more reference points can be selected from the display curve to align with textual units of the foreground text. As such, the foreground text can be considered to be displayed according to aspects (for example, the shape) of the display curve. In some cases, the texture or shape of the foreground text can be processed before synthesis to the background image.

For foreground images, one or more curve functions can be randomly selected from the plurality of available stored curve functions to generate one or more display curves. The one or more display curves can be used to determine a boundary or a shape for displaying the foreground image. Boundaries depend on the template and generated curves. The shape is based on a randomly generated deformation function and the affine transformation of the entire image is performed. Similar to the description with respect to the foreground text, the texture or shape of the foreground image can also be processed before synthesis to the background image. Accordingly, synthesized images can include a variety of background images, layouts, foreground shapes, and formats.

By providing a plurality of background images to choose from, generating and arranging sub-regions dynamically, and displaying foreground elements with different shapes and formats, a large number of synthesized images with different compositions can be generated within a short period of time. Therefore, image synthesis efficiency can be improved and computational cost of image diversification can be decreased. Because the synthesized images can have a variety of background images, foreground element layouts, shapes, and formats, they can also be more aesthetically pleasing to a user.

FIG. 1 is a flow chart illustrating an example method 100 for generating a synthesized image, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some cases, various steps of method 100 can be run in parallel, in combination, in loops, or in any order.

At 110, method 100 can select a background image from a plurality of background images. The set of background images can be pre-stored in the memory of any computing device that can perform method 100, such as a server, a computer, a smartphone, or tablet. The selected background image can be directly used for image synthesizing, or it can be processed before image synthesizing.

A variety of methods can be used to select a background image from the set of background images for synthesizing images with different compositions. In some cases, each background image can be selected on a rotational basis or randomly from the set of background images. In some cases, a new background image can be selected for synthesizing images when a synthesized image has been used for a pre-determined amount of time. In some cases, a new background image can be selected for synthesizing images after a predetermined period of time.

Similarly, a variety of image processing methods can be used to process the selected background image to a background image for image synthesizing. For example, image processing methods can include Gaussian blurring processing, light treatment processing, or mask processing. In some cases, fixed processing algorithms or parameters can be used to perform image processing. In some other cases, algorithms or parameters used to perform image processing can be randomly or periodically changed based on the curve functions used to generate the display curves. For example, if the curve function is a sine function, the curve can change periodically as a function of angle. As previously mentioned, the background image can also be treated as a background image and used directly for image synthesizing.

It is to be understood that any combination of the aforementioned background image selection and image processing methods can be used for image synthesis according to the present disclosure. The method for selecting the background image and the method for generating the background image of the synthesized image can be used in any combination, and is not limited to particularly-described implementations.

In some cases, foreground image elements can cover a small portion of the background image. Identifying a synthesized image based on its background image can be easier when the uncovered area of the background image is larger. When the foreground image or text regions account for less area, if the background image is fixed, one or more aspects of the fixed background image can be relied on to provide identification. Dynamically selecting or changing the background image can make the synthesized image more difficult to be detected by image recognition technologies such as computer vision, which can be suitable for certain implementation scenarios. A random change of a foreground image, text location, or shape, results in generation of a different image background exposed in different regions. As a result, a computer vision detection method becomes challenging. From 110, method 100 proceeds to 120.

At 120, method 100 can divide at least a portion of the selected background image into one or more sub-regions for displaying one or more selected foreground elements, where each sub-region is used to display at least one foreground element.

In some implementations, the division of sub-regions can be determined based on relationships between the foreground elements associated with different sub-regions and requirements of the particular implementation. For example, some templates require one-line of words to be place above or below the other line. If the foreground elements can be superimposed on any positions of the background image, the number of sub-regions can be based on the number of foreground elements, and the sizes and positions of the sub-regions can be randomly determined. If there is no restriction on the template in mapping the location of foreground pictures in relation to the background, then position and shape can be created by generating foreground pictures or text, and pasting them somewhere onto the background.

If the foreground elements need to be displayed based on certain criteria (such as, positional relationships or proportional size relationships), then related foreground elements can be displayed in the same sub-region, or certain limitations can be applied to sub-regions that display the related foreground elements.

In some implementation, a configuration file can indicate limitations on how the sub-regions should be divided to satisfy the display conditions of the foreground elements can be provided. For example, the configuration file can include the number of sub-regions and positional relationships of at least a portion of the sub-regions. In some implementations, the configuration file can be used by a configuration algorithm to calculate the layout of the sub-regions. After obtaining the number and positional relationships of the sub-regions from the configuration file, the configuration algorithm can calculate a dynamic range for each sub-region for positioning the sub-regions with respect to the background image, and determine allowable locations of vertexes or borders and size of each sub-region based on the calculated dynamic range.

In some cases, the configuration file can further include information indicating the shape of the sub-regions, and the maximum and minimum size of the sub-regions. In such cases, the shape, size, and positional relationships of the sub-regions can be considered to determine the allowable dynamic ranges for the sub-regions. The sub-regions can have any vertex or border locations, and sizes within their respective dynamic ranges and in compliance to the conditions of the configuration file.

Figure 2:
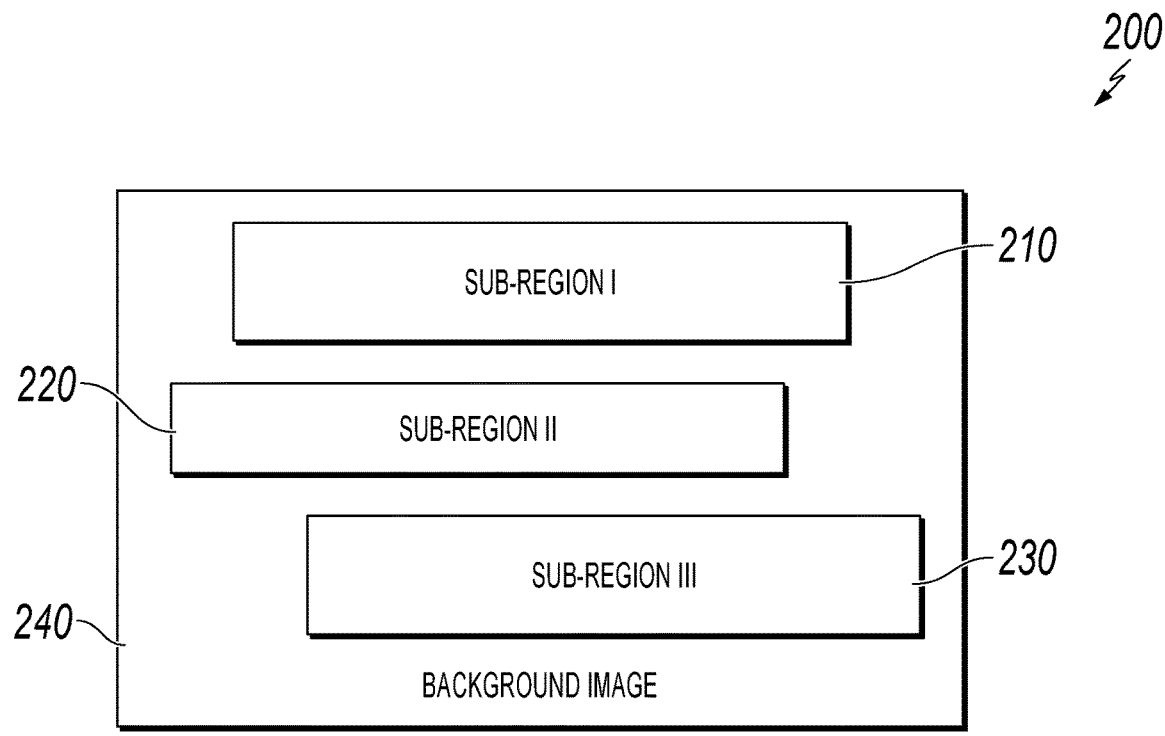
FIG. 2 shows an example sub-region layout with respect to a background image, according to an implementation of the present disclosure.
Figure 3:
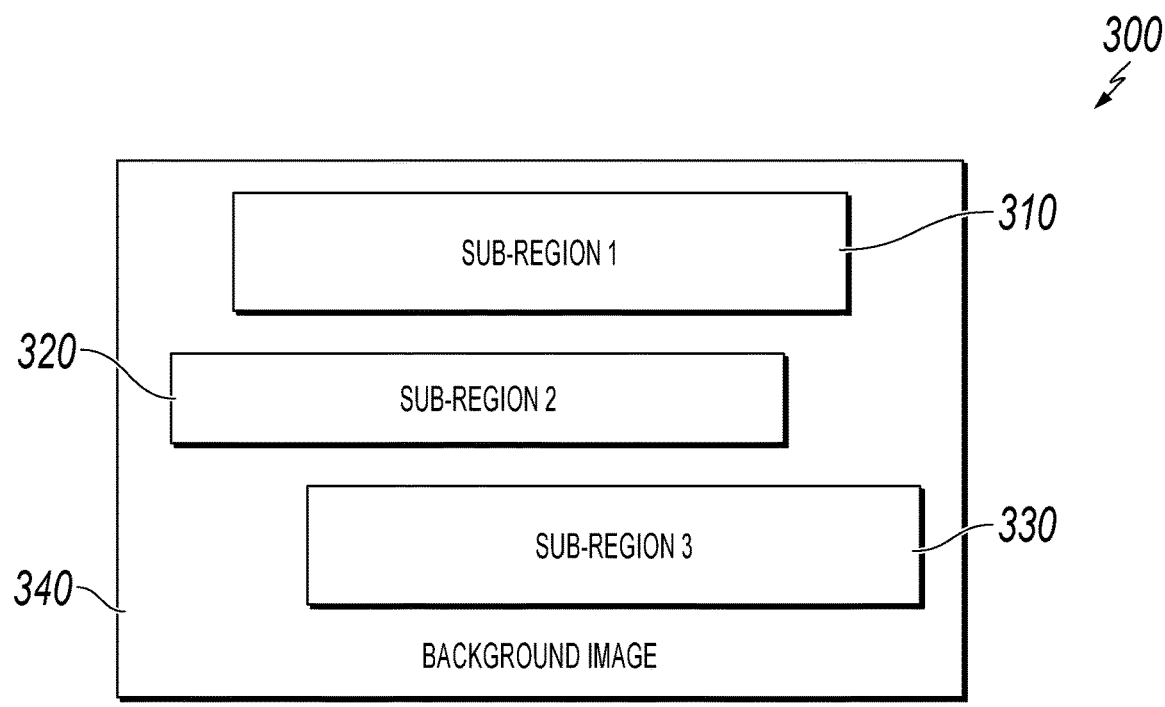
FIG. 3 shows another example sub-region layout with respect to a background image, according to an implementation of the present disclosure.

Turning to FIG. 2, FIG. 2 shows an example sub-region layout 200 with respect to a background image, according to an implementation of the present disclosure. In sub-region layout 200, the configuration file can indicate three sub-regions: 1) sub-region I 210; 2) sub-region II 220; and sub-region III 230, arranged from top-to-bottom of the background image 240. A configuration algorithm can be used to generate the sub-region layout 200 based on the configuration file. Turning to FIG. 3, FIG. 3 shows another sub-region layout 300 (that is, 1) sub-region 1 310; 2) sub-region 2 320; and sub-region 3 330) with respect to a background image 340, according to an implementation of the present disclosure. Returning to FIG. 1, from 120, method 100 proceeds to 130.

Returning to FIG. 1, at 130, method 100 can determine a display format and a display location for each of the one or more foreground elements. As previously described, the foreground element can be a foreground image or foreground text such as a line of text. The line of text can include one or more textual units. In some implementations, the textual unit can be a character (for example, a Chinese or English character), a word, a letter, a number, or a symbol.

In some implementations, different shapes can be used for displaying a foreground element in a sub-region. In some implementations, a plurality of shapes, such as the original shape of the foreground element, a circle, a square, or a triangle can be predetermined to display the foreground element in the sub-region. The shape of some elements (such as, a logo) are not allowed to deform/change. In some implementations, the shape can be selected randomly or on a rotational basis from the plurality of shapes for displaying the foreground element. When the foreground element is a line of text, each textual unit can be displayed in the selected shape or the textual units can be arranged to form the selected shape to be displayed. For example, each textual word produces a position and deformation separately, or a curve template produces a shape for each line. Each word is positioned on the associated curve in order to perform a corresponding deformation.

In some implementations, one or more curve functions can be used to generate one or more display curves for displaying the foreground element in the sub-region. The parameters used for the curve function can take values within a predetermined range. For example, if the curve function is a cosine function, the predetermined range of the angle parameter to generate the function can be from 0 to 2π. The parameters used can vary based on different curve functions. The parameter values within the predetermined range can allow for at least a portion of the foreground element to be located/displayed in the sub-region based on the display curve generated by the curve function (for example, a is a parameter for the cos(a) function).

In some implementations, the foreground element can be a line of text. To display the line of text based on a curve function, the curve function can first be selected from a plurality of predetermined curve functions. The values of parameters used for the curve function can be selected from the predetermined ranges of the parameters. The curve function can then generate a display curve based on the values selected for the parameters. Based on a number of textual units in the line of text, a same number of points can be selected from the display curve as reference points to align the textual units.

Figure 4:
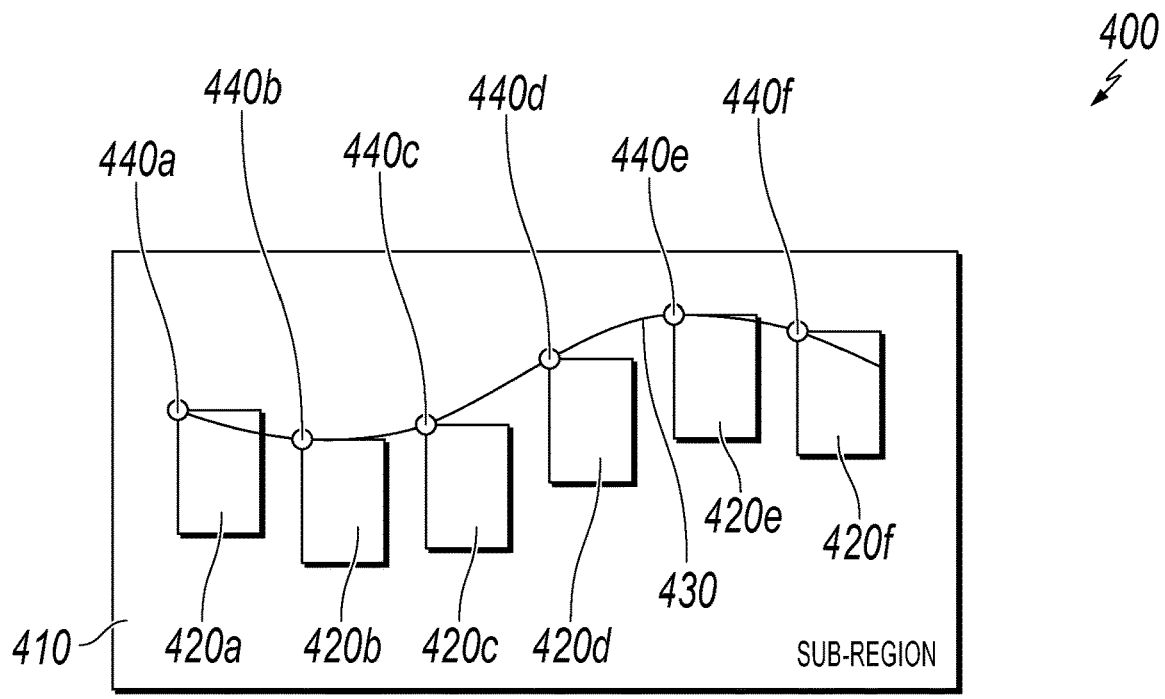
FIG. 4 is a schematic diagram illustrating an example display arrangement of a line of text in a sub-region of a background image, according to an implementation of the present disclosure.

Turning to FIG. 4, FIG. 4 is a schematic diagram illustrating an example display arrangement 400 of a line of text in a sub-region of a background image, according to an implementation of the present disclosure. Display arrangement 400 illustrates that the line of text in the sub-region 410 includes six textual units (420a-420f). To display the six textual units based on the display curve 430, the display curve can first be equally divided into six segments according to a horizontal coordinate of the six textural units. The starting point of each segment can be used as a reference point (440a-440f) to align each of the textual units. In display arrangement 400, the top left corner of each textual unit is aligned to the reference points. As such, the line of text is displayed in the sub-region 410 according to the display curve.

In some implementations, the foreground element can be an image. Similar to the previous display arrangement 400, reference points can be extracted from a display curve for positioning the foreground images. In some implementations, one or more display curves can be used as display boundaries of the foreground image. For example, a curve function can be selected to generate two parallel display curves by using different parameter values. The two parallel display curves can serve as upper/lower boundaries (or left/right, diagonal, or other spatially-oriented boundaries) for the foreground image. In some implementations, two additional parallel lines can be added or generated by a curve function to intersect with two other parallel display curves to form a closed loop/area for displaying the foreground image. As another example, two curve functions can be used to generate two intersecting display curves that can be used as the left and top boundaries for displaying the foreground image. The right and bottom boundaries of the corresponding sub-region can be leveraged as the right and bottom boundaries of the foreground image.

Figure 5:
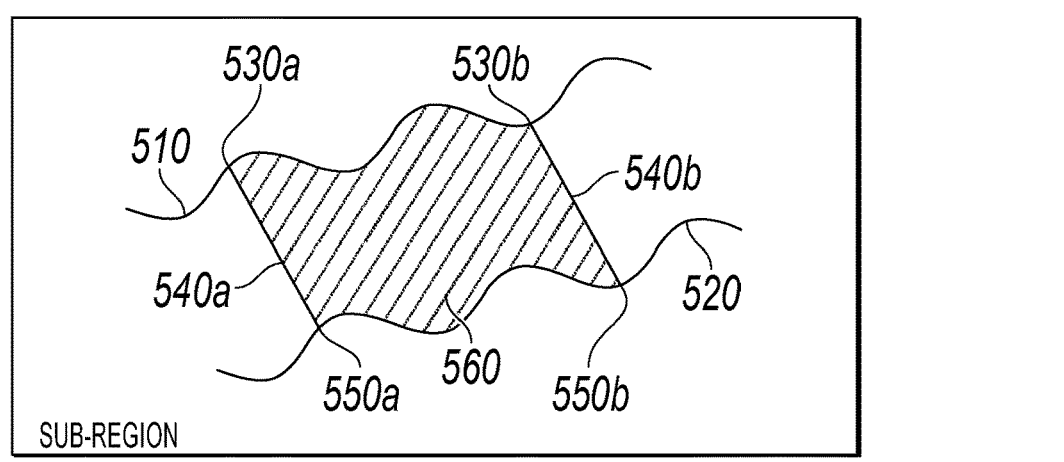
FIG. 5 is a schematic diagram illustrating an example display shape of a foreground image in a sub-region of a background image, according to an implementation of the present disclosure.

Referring to FIG. 5, FIG. 5 is a schematic diagram illustrating an example display shape 500 of a foreground image, according to an implementation of the present disclosure. A curve function can be used to generate a first display curve 510 (upper). The first display curve can be copied and translated by a certain distance to form a second display curve 520 (lower) that is parallel to the first display curve. Or the curve function can use different parameter values to generate a second display curve. Two points 530a and 530b at corresponding ends of two straight lines 540a and 540b (formed by translation of the two points 530a and 530b) can be selected on the first display curve to serve as two vertex points for displaying the foreground image. The two points can be translated onto the second display curve 520 to serve as another two vertex points 550a and 550b of the foreground image. The enclosure 560 (shaded region) formed by two display curves and the two straight lines 540a and 540b can serve as the boundary for displaying the foreground image. The shape of the foreground image to display on the background image can be the shape of the enclosure 560.

In some implementations, foreground elements can include both a foreground image and a line of text. The line of text can be synthesized on the foreground image after the foreground image is synthesized to the background image. Here, the display location and format of the line of text can be determined based on the foreground image. In other words, the foreground image can be considered as a sub-region for determining the display location and format of the line of text. Returning to FIG. 1, from 130, method 100 proceeds to 140.

At 140, method 100 can synthesize the one or more foreground elements to the corresponding one or more sub-regions of the background image based on the display format and the display location.

For foreground images, when the desired display shape or format of the image is different from the original image, the original image can be processed to generate the foreground image and synthesized to the sub-region. Various processing techniques can be used to generate the foreground image based on the desired display shape and format of the foreground element in the corresponding sub-region. Example techniques can include affine transformation, perspective transformation, scaling transformation, color transformation, rotation, and stretching. In some cases, the processing techniques or the parameters of a certain technique can be selected at random to further diversify the appearances of the foreground image. In some implementations, the candidate types of deformation are preset, and a deformation is selected randomly on the line. The parameters needed for the selected deformation are generated at random in the allowable range. The foreground pictures of the original pictures can be obtained by this type of deformation.

For foreground text, it is desirable, in some implementations, that text cannot be recognized using text recognition techniques such as optical character recognition (OCR). For example, certain websites or applications can apply automatic OCR for text recognition and block content based on certain determined criterion, such as particular keywords or patterns. Processing the text into an unrecognizable format can prevent text or related images from being blocked. Example processing techniques can include adding texture or reshaping the lines of text. Example texture can include horizontal, vertical, or curved stripes with different spacing. The lines of text and the added texture can be displayed on the background image, or a particular color fusion can be added to fade the foreground text with respect to the background image. Reshaping operations can include, for example, stretching, rotation, and resizing. Other techniques consistent with this disclosure can also be used to process the foreground text to prevent recognition without departing from the scope of the present disclosure.

As described in the various implementations of the present disclosure, by having a plurality of images for the background image to choose from, generating and arranging sub-regions dynamically, and displaying foreground elements with different shapes and formats, a large number of synthesized images with different compositions can be generated within a short period of time. Therefore, the efficiency of image synthesizing can be improved and the cost for image diversification can be decreased. Because the synthesized images can have a variety of background images, foreground element layouts, shapes, and formats, they can be more aesthetically pleasing to a user.

The various implementations described in this disclosure can be used by any computing device, such as a server, a virtual machine, a personal computer, a tablet computer, a mobile phone, etc. In some cases, a system suitable for one or more implementations of this disclosure can have client/server (C/S) structure. In such cases, the example processes disclosed in the various implementations of the disclosure can be partly performed by the server and partly performed by the client device to collaboratively synthesize images.

Figure 6:
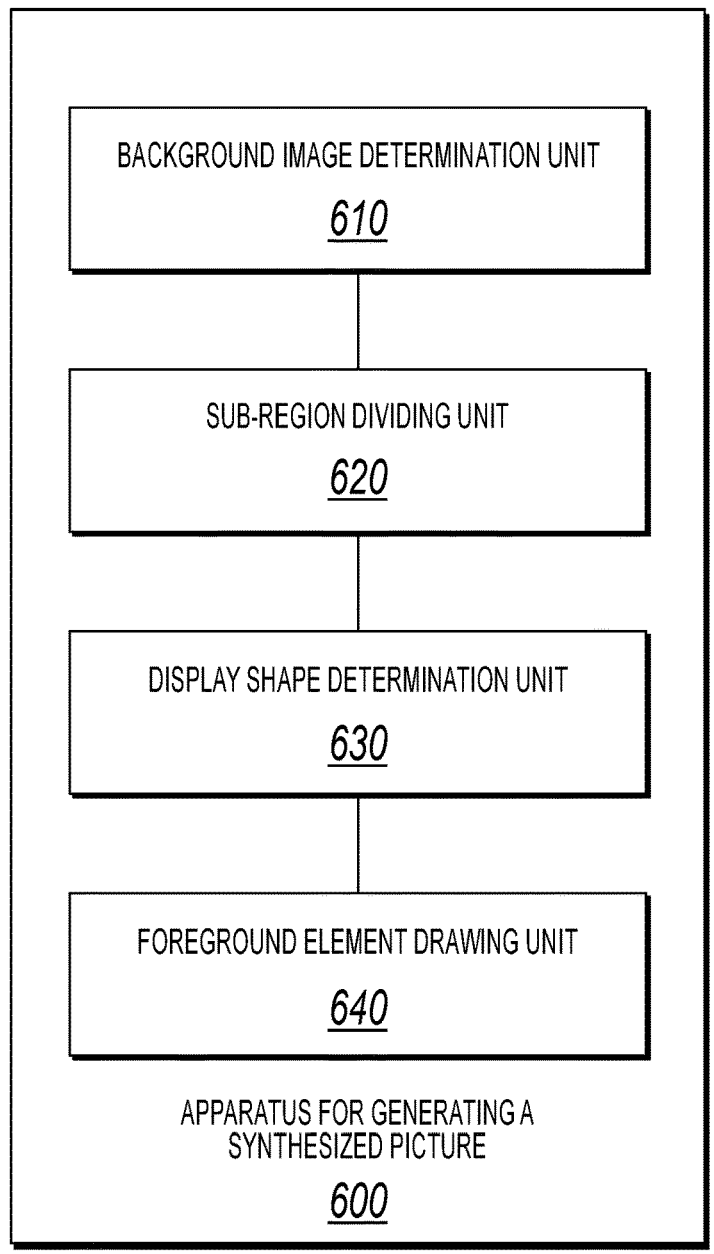
FIG. 6 is a block diagram showing an example apparatus for generating a synthesized image, according to an implementation of the present disclosure.

FIG. 6 is a block diagram showing an example apparatus 600 for generating a synthesized image, according to an implementation of the present disclosure. At a high level, apparatus 600 includes a background image determination unit 610, a sub-region dividing unit 620, a display shape determination unit 630, and a foreground element drawing unit 640. The background image determination unit 610 can determine a background image from a plurality of background images and convert the background image to a background image of the synthesized image.

The sub-region dividing unit 620 can determine sub-regions for foreground elements on the background image. Each sub-region can be used for displaying at least one foreground element. In some cases, the sub-region dividing unit can further include a positional relationship acquisition module, a dynamic region calculation module, and a sub-region position and size module. The positional relationship acquisition module can acquire, based on a configuration file, the number of sub-regions and a positional relationship of at least two sub-regions. The dynamic region calculation module can calculate, based on the positional relationship, a region where a dynamic range is allowed for placing a sub-region on the background image. The sub-region position and size module can determine, within the region defined by the vertex, positions and size of the sub-region.

The display shape determination unit 630 can determine, within a sub-region, a display shape of a foreground element for the sub-region. In some cases, the foreground element can be a foreground image or foreground text. The display shape determination unit 630 can include a first curve function selection module, a first display curve generation module, and a foreground image shape module. The first curve function selection module can select at least one curve function from a plurality of predetermined curve functions. The first display curve generation module can determine parameter values for the curve function within predetermined ranges and generate at least one display curve. The foreground image shape module can select reference points from the display curve as vertex points for displaying the foreground image, or use the display curve as display boundary of the foreground image.

In some cases, the foreground element can be a foreground image. The foreground element drawing unit 640 can perform affine transformation, perspective transformation or scaling transformation to the foreground image before synthesizing to the sub-region.

In some cases, the foreground element can be foreground text or a line of text. The display shape determination unit 630 can include a second curve function selection module, a second display curve generation module and a text shape module. The second curve function selection module can select a curve function from a plurality of predetermined curve functions. The second display curve generation module can determine parameter values of the curve function within predetermined ranges and generate a display curve. The text shape module selects a number of reference points from the display curve, according to the number of textual units in the line of text, and uses the reference points as vertex points for each text unit.

The foreground element drawing unit 640 can draw, according to the display shape, the corresponding foreground text within the sub-region. In some cases, the foreground element drawing unit 640 can add texture or reshape the textual units of the line of text before drawing the foreground text to the sub-region. Returning to FIG. 1, after 140, method 100 stops.

Figure 7:
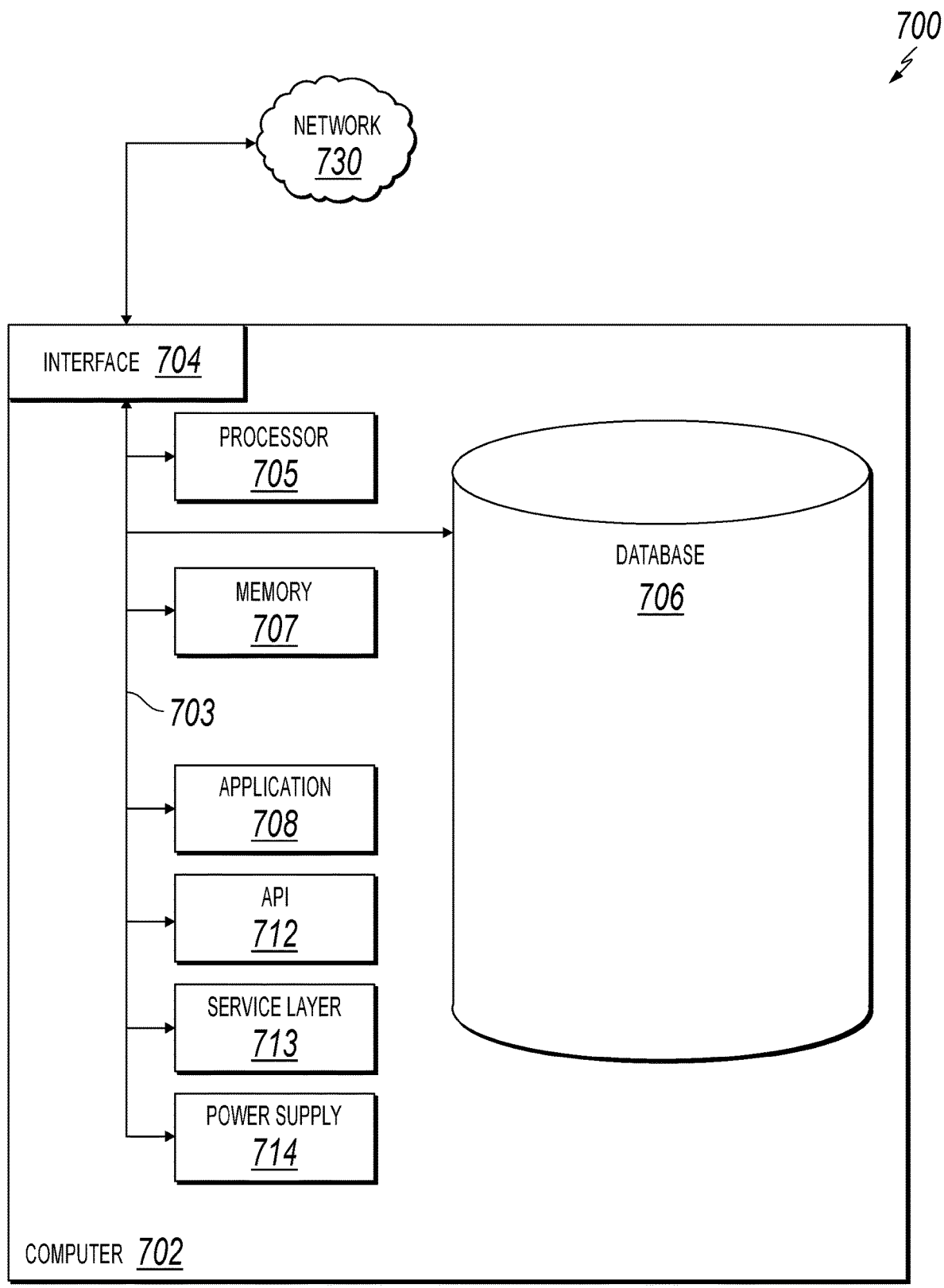
FIG. 7 is a block diagram illustrating an example computer system used to provide computational functionalities associated with described algorithms, methods, functions, processes, flows, and procedures as described in the instant disclosure, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method for image synthesis, comprises: selecting a background image from a plurality of source images; selecting one or more foreground elements from a plurality of source files, wherein the foreground elements include at least one of a foreground image or a foreground text; dividing at least a portion of the selected background image to one or more sub-regions for displaying the one or more selected foreground elements, wherein each sub-region is used for displaying at least one foreground element; determining a display format and a display location for each of the one or more foreground elements; and synthesizing the one or more foreground elements to the corresponding one or more sub-regions of the background image based on the display format and the display location.

The foregoing and other described implementations can each, optionally, include one or more of the following features:

A first feature, combinable with any of the following features, further comprises processing the selected background image based on at least one of Gaussian blurring processing, light treatment processing, or mask processing.

A second feature, combinable with any of the previous or following features, further comprises, acquiring, from a configuration file, a number of sub-regions and a positional relationship of at least two of the sub-regions; calculating, based on the number of sub-regions and the positional relationship, a maximum region for each sub-region that the sub-region can cover; and determining, within each maximum region, the boundary of the corresponding sub-region.

A third feature, combinable with any of the previous or following features, wherein the one or more foreground elements include at least one foreground image, and the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; and selecting reference points from the at least one display curve to align the foreground image or using the at least one display curve as at least one boundary of the foreground image.

A fourth feature, combinable with any of the previous or following features, wherein the one or more foreground elements include at least one foreground image, and the method further comprises performing at least one of an affine transformation, a perspective transformation, or a scaling transformation to the foreground image based on the display format.

A fifth feature, combinable with any of the previous or following features, wherein the one or more foreground elements include at least one foreground text and the foreground text includes one or more textual units, the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; selecting a number of reference points based on the number of the textual units; and aligning the textual units with the reference points.

A sixth feature, combinable with any of the previous or following features, wherein the foreground text displays on the foreground image, and wherein determining the display format and the display location of the foreground element further comprises determining the display format and the display location of the foreground text to be displayed on the foreground image.

A seventh feature, combinable with any of the previous or following features, further comprises adding texture or reshaping the one or more foreground elements before synthesizing to the background image.

In a second implementation, a non-transitory, computer-readable medium storing one or more instructions executable by a computer system to perform operations, comprises, selecting a background image from a plurality of source images; selecting one or more foreground elements from a plurality of source files, wherein the foreground elements include at least one of a foreground image or a foreground text; dividing at least a portion of the selected background image to one or more sub-regions for displaying the one or more selected foreground elements, wherein each sub-region is used for displaying at least one foreground element; determining a display format and a display location for each of the one or more foreground elements; and synthesizing the one or more foreground elements to the corresponding one or more sub-regions of the background image based on the display format and the display location.

The foregoing and other described implementations can each, optionally, include one or more of the following features:

A first feature, combinable with any of the following features, further comprises processing the selected background image based on at least one of Gaussian blurring processing, light treatment processing, or mask processing.

A second feature, combinable with any of the previous or following features, further comprises, acquiring, from a configuration file, a number of sub-regions and a positional relationship of at least two of the sub-regions; calculating, based on the number of sub-regions and the positional relationship, a maximum region for each sub-region that the sub-region can cover; and determining, within each maximum region, the boundary of the corresponding sub-region.

A third feature, combinable with any of the previous or following features, wherein the one or more foreground elements include at least one foreground image, and the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; and selecting reference points from the at least one display curve to align the foreground image or using the at least one display curve as at least one boundary of the foreground image.

A fourth feature, combinable with any of the previous or following features, wherein the one or more foreground elements include at least one foreground image, and the method further comprises performing at least one of an affine transformation, a perspective transformation, or a scaling transformation to the foreground image based on the display format.

A fifth feature, combinable with any of the previous or following features, wherein the one or more foreground elements include at least one foreground text and the foreground text includes one or more textual units, the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; selecting a number of reference points based on the number of the textual units; and aligning the textual units with the reference points.

A sixth feature, combinable with any of the previous or following features, wherein the foreground text displays on the foreground image, and wherein determining the display format and the display location of the foreground element further comprises determining the display format and the display location of the foreground text to be displayed on the foreground image.

A seventh feature, combinable with any of the previous or following features, further comprises adding texture or reshaping the one or more foreground elements before synthesizing to the background image.

In a third implementation, A computer-implemented system, comprises, one or more computers; and one or more computer memory devices interoperably coupled with the one or more computers and having tangible, non-transitory, machine-readable media storing instructions that, when executed by the one or more computers, perform operations, comprises, selecting a background image from a plurality of source images; selecting one or more foreground elements from a plurality of source files, wherein the foreground elements include at least one of a foreground image or a foreground text; dividing at least a portion of the selected background image to one or more sub-regions for displaying the one or more selected foreground elements, wherein each sub-region is used for displaying at least one foreground element; determining a display format and a display location for each of the one or more foreground elements; and synthesizing the one or more foreground elements to the corresponding one or more sub-regions of the background image based on the display format and the display location.

The foregoing and other described implementations can each, optionally, include one or more of the following features:

A first feature, combinable with any of the following features, further comprises processing the selected background image based on at least one of Gaussian blurring processing, light treatment processing, or mask processing.

A second feature, combinable with any of the previous or following features, further comprises, acquiring, from a configuration file, a number of sub-regions and a positional relationship of at least two of the sub-regions; calculating, based on the number of sub-regions and the positional relationship, a maximum region for each sub-region that the sub-region can cover; and determining, within each maximum region, the boundary of the corresponding sub-region.

A third feature, combinable with any of the previous or following features, wherein the one or more foreground elements include at least one foreground image, and the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; and selecting reference points from the at least one display curve to align the foreground image or using the at least one display curve as at least one boundary of the foreground image.

A fourth feature, combinable with any of the previous or following features, wherein the one or more foreground elements include at least one foreground image, and the method further comprises performing at least one of an affine transformation, a perspective transformation, or a scaling transformation to the foreground image based on the display format.

A fifth feature, combinable with any of the previous or following features, wherein the one or more foreground elements include at least one foreground text and the foreground text includes one or more textual units, the method further comprises: selecting at least one curve function from a plurality of predetermined curve functions; determining one or more parameters of the at least one curve function, and a value for each of the one or more parameters within a predetermined range; generating at least one display curve based on the value for each of the one or more parameters; selecting a number of reference points based on the number of the textual units; and aligning the textual units with the reference points.

A sixth feature, combinable with any of the previous or following features, wherein the foreground text displays on the foreground image, and wherein determining the display format and the display location of the foreground element further comprises determining the display format and the display location of the foreground text to be displayed on the foreground image.

A seventh feature, combinable with any of the previous or following features, further comprises adding texture or reshaping the one or more foreground elements before synthesizing to the background image.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for providing multiple distinct, synthesized images that each include a same background image and a same foreground element, the method comprising:
    selecting a background image and quantity n foreground elements that are both to be used to generate each of multiple, distinct synthesized images;
    selecting a sub-region of the background image in which the foreground element is to be synthesized in each of the multiple, distinct synthesized images;
    for each of the multiple, distinct synthesized images that are to be generated:
        selecting a parameter that is unique to the synthesized image that is to be generated,
        selecting, from among multiple pre-determined curve functions that are each associated with displaying foreground elements in synthesized images, a particular curve function based at least on the parameter that is unique to the synthesized image that is to be generated,
        generating a curve based on the selected, particular curve function,
        dividing the curve into n line segments,
        for each of the foreground elements, aligning the foreground element with a starting point of a different line segment,
        and
        generating a distinct, synthesized image that comprises the background image overlaid within the sub-region by the foreground elements that are each aligned with a starting point of a different line segment; and
    providing one or more of the multiple, distinct synthesized images in response to a request for a synthesized image.

2. The method of claim 1, wherein each foreground element comprises text.

3. The method of claim 1, wherein each foreground element comprises a foreground image.

4. The method of claim 1, comprising dividing the background image into sub-regions based on configuration information associated with the foreground elements.

5. The method of claim 1, comprising processing the foreground elements to be unrecognizable by an automated optical character recognition (OCR) process.

6. The method of claim 1, wherein aligning the foreground element comprises determining a display shape associated with the foreground element.

7. A non-transitory computer-readable medium storing one or more instructions executable by a computer system to perform operations for providing multiple distinct, synthesized images that each include a same background image and a same foreground element, the operations comprising:
- selecting a background image and quantity n foreground elements that are both to be used to generate each of multiple, distinct synthesized images;
- selecting a sub-region of the background image in which the foreground element is to be synthesized in each of the multiple, distinct synthesized images;
- for each of the multiple, distinct synthesized images that are to be generated:
  - selecting a parameter that is unique to the synthesized image that is to be generated,
  - selecting, from among multiple pre-determined curve functions that are each associated with displaying foreground elements in synthesized images, a particular curve function based at least on the parameter that is unique to the synthesized image that is to be generated,
  - generating a curve based on the selected, particular curve function,
  - dividing the curve into n line segments,
  - for each of the foreground elements, aligning the foreground element with a starting point of a different line segment, and
  - generating a distinct, synthesized image that comprises the background image overlaid within the sub-region by the foreground elements that are each aligned with a starting point of a different line segment; and
- providing one or more of the multiple, distinct synthesized images in response to a request for a synthesized image.

8. The non-transitory computer-readable medium of claim 7, wherein each foreground element comprises text.

9. The non-transitory computer-readable medium of claim 7, wherein each foreground element comprises a foreground image.

10. The non-transitory computer-readable medium of claim 7, wherein the operations comprise dividing the background image into sub-regions based on configuration information associated with the foreground elements.

11. The non-transitory computer-readable medium of claim 7, wherein the operations comprise processing the foreground elements to be unrecognizable by an automated optical character recognition (OCR) process.

12. The non-transitory computer-readable medium of claim 7, wherein aligning the foreground element comprises determining a display shape associated with the foreground element.

13. A system comprising:
- one or more computers; and
- one or more computer memory devices interoperably coupled with the one or more computers and having tangible, non-transitory, machine-readable media storing instructions, that when executed by the one or more computers, perform operations for providing multiple distinct, synthesized images that each include a same background image and a same foreground element, the operations comprising:
  - selecting a background image and quantity n foreground elements that are both to be used to generate each of multiple, distinct synthesized images;
  - selecting a sub-region of the background image in which the foreground element is to be synthesized in each of the multiple, distinct synthesized images;
  - for each of the multiple, distinct synthesized images that are to be generated:
    - selecting a parameter that is unique to the synthesized image that is to be generated,
    - selecting, from among multiple pre-determined curve functions that are each associated with displaying foreground elements in synthesized images, a particular curve function based at least on the parameter that is unique to the synthesized image that is to be generated,
    - generating a curve based on the selected, particular curve function,
    - dividing the curve into n line segments,
    - for each of the foreground elements, aligning the foreground element with a starting point of a different line segment,
    - and
    - generating a distinct, synthesized image that comprises the background image overlaid within the sub-region by the foreground elements that are each aligned with a starting point of a different line segment; and
  - providing one or more of the multiple, distinct synthesized images in response to a request for a synthesized image.

14. The system of claim 13, wherein each foreground element comprises text.

15. The system of claim 13, wherein each foreground element comprises a foreground image.

16. The system of claim 13, wherein the operations comprise dividing the background image into sub-regions based on configuration information associated with the foreground elements.

17. The system of claim 13, wherein the operations comprise processing the foreground elements to be unrecognizable by an automated optical character recognition (OCR) process.

* * * * *